United States Patent [19]

Kubo

[11] Patent Number: 5,800,708
[45] Date of Patent: Sep. 1, 1998

[54] INTERFACIAL PURIFYING APPARATUS USING TOURMALINE

[76] Inventor: Tetsujiro Kubo, 5-12-408, Shibuya 2-chome, Shibuya-ku, Tokyo, Japan, 150

[21] Appl. No.: 858,617

[22] Filed: May 19, 1997

Related U.S. Application Data

[63] Continuation of Ser. No. 661,725, Jun. 11, 1996, abandoned, which is a continuation of Ser. No. 257,490, Jun. 9, 1994, abandoned, which is a continuation of Ser. No. 968,143, Oct. 29, 1992, abandoned, which is a continuation of Ser. No. 874,230, Apr. 27, 1992, abandoned, which is a continuation of Ser. No. 586,973, Sep. 24, 1990, abandoned.

[30] Foreign Application Priority Data

Oct. 3, 1989 [JP] Japan ................................ 1-257130

[51] Int. Cl.$^6$ ................................ B01D 24/00
[52] U.S. Cl. ................................ 210/287
[58] Field of Search ................................ 210/661, 263, 210/266, 287, 243

[56] References Cited

U.S. PATENT DOCUMENTS

| | | | |
|---|---|---|---|
| 3,173,862 | 3/1965 | Clements et al. | 210/661 |
| 3,458,436 | 7/1969 | Martinola et al. | 210/661 |
| 3,561,599 | 2/1971 | Sheen | 210/198.3 |
| 3,975,257 | 8/1976 | Hulse | 204/150 |
| 4,003,252 | 1/1977 | Dewath | 73/861.27 |
| 4,406,793 | 9/1983 | Kruyer | 210/693 |
| 4,904,394 | 2/1990 | Clarke et al. | 210/748 |
| 4,952,321 | 8/1990 | Bradshaw et al. | 210/679 |
| 5,108,618 | 4/1992 | Hirasawa | 210/689 |

OTHER PUBLICATIONS

"Flowlet" product brochure (No. 1), Jun. 1989.
"Flowlet" product brochure translation, published Jun. 1989.
New Technology Japan, vol. 18, No. 9, "Legionella Contamination Prevention for Cooling Systems", Dec. 1990.
Solid State Physics, vol. 24, No. 12, "Interface Activity of Water Given Rise to by Tourmaline", T. Kubo, Dec. 1989.
Nippon Shokuhin Kogyo Gakkaishi, vol. 38, No. 5, pp. 422–424, 1991.
Flowlet Water Activator, Product Brochure (English translation), publication date Jun. 1989 ("Brochure No. 1").
Flowlet Water Activator, Product Brochure (English translation), exact publication date unknown but sometime between Feb. to Jun. 1990 ("Brochure No. 2").
Flowlet Water Activator, Product Brochure (English translation), publication date May 1992 ("Brochure No. 3").

*Primary Examiner*—Ivars Cintins
*Attorney, Agent, or Firm*—Wenderoth, Lind & Ponack, LLP

[57] ABSTRACT

Ceramic spheres containing crystallites of the popular crystal tourmaline are produced by sintering. Water that has flowed through a vessel containing a large amount of the ceramic spheres has been found to show interface activity, such as emulsification, washing and permeation. This activity endures for a couple of days. An excess of isolated hydroxil ion ($H_3O_2$)-occurring in the water likely causes the activity.

4 Claims, 4 Drawing Sheets

| HLB | APPLICATIONS |
|---|---|
| 15 ~ 18 | SOLUBILIZER |
| 13 ~ 15 | DETERGENT |
| 8 ~ 18 | O/W-TYPE EMULSIFIER |
| 7 ~ 9 | WETLING AGENT |
| 3.5 ~ 6 | W/O-TYPE EMULSIFIER |
| 1.5 ~ 3 | DEFOAMING AGENT |

INTERFACIAL PURIFYING APPARATUS USING TOURMALINE

This application is a continuation application of now abandoned application, Ser. No. 08/661,725 filed Jun. 11, 1996, which is a continuation of abandoned application, Ser. No. 08/257,490 filed Jun. 9, 1994, which is a continuation of abandoned application, Ser. No. 07/968,143 filed Oct. 29, 1992, which is further a continuation of abandoned application Ser. No. 07/874,230 filed Apr. 27, 1992, which in turn is a continuation of abandoned application Ser. No. 07/586,973 filed Sep. 24, 1990.

BACKGROUND OF THE INVENTION

1. Field of the Invention

The present invention relates broadly to obtaining water having an interface activity by intensifying the interfacial purifying action inherent in water and by newly imparting to water an interface activating action which the water does not normally possess. More specifically, the invention relates to an interfacial purifying apparatus using tourmaline, a method thereof, and granules composed of tourmaline crystals as a chief component.

The present invention essentially includes seven separate but related inventions as described below.

In general, the first to sixth inventions relate to interfacial purifying apparatuses and to methods using tourmaline by repeatedly bringing a plurality of granules, also referred to as free bodies hereinbelow, composed of tourmaline crystals as a chief component into contact and collision with one another, such that matters adhered to the surfaces of the plurality of free bodies are dislodged from the surface of the free bodies.

The second and fifth inventions provide free bodies having an increased mechanical strength such as abrasion resistance using a ceramic, and the third invention relates to the method thereof.

The fourth and fifth inventions relate to interfacial purifying apparatuses utilizing the electrification phenomenon by bringing a plurality of ceramic bodies into contact and collision with one another, in addition to utilizing the permanent electrodes of the tourmaline crystals, and the sixth invention relates to the method thereof. The seventh invention relates to the tourmaline granules used for all of the aforementioned inventions. These inventions are discussed in specific detail hereinbelow.

2. Prior Art

There have heretofore been proposed methods of washing a variety of interfaces by dissolving in water chemical agents such as detergents composed chiefly of a surface activating agent. However, there has not yet been proposed a method of washing a variety of interfaces not using chemical agents but using interface-active water produced by utilizing electric energy to wash interfaces.

Systems which use the above-mentioned chemical surface activating agents are not only expensive in terms of the construction of their facilities and purchase of chemicals, but they also cause environment pollution which adversely effects rivers, lakes, ponds, seas, animals, plants, and humans. This results in the need to expand the facility to treat the wastes generated, creating a vicious circle.

The present patent applicant has previously filed a Japanese patent application relating to an invention covering an electret streaming electric field purifying apparatus and method thereof on Sep. 7, 1988 (Japanese Patent Application No. 222559/1988). The applicant has now conducted further studies and has arrived at the present invention.

What should be noted initially is that the present invention relates to "interfacial purification", not simply to a "treatment of water".

That is, the interfacial purifying unit or apparatus of the invention using tourmaline is not simply a water treatment apparatus, although it does create a change in water properties. The treatment of water has a primary meaning of purifying water by removing contaminants in water. In the case of the "interfacial purifying apparatus", the substance to be treated is not "water" per se but contaminants such as those that are incrusted and adhered to the surface of tiles, or red rust, in conduits. The water has a "self-purifying action", i.e., it cleans the surfaces of paths such as conduits and walls of a reservoir which come in contact with water, thereby to prevent water itself from being contaminated. In this case, it is not the water that is treated but it is the foul on the interface that is treated. The object of the invention is thus to purify or fix the contaminant on the interface and to prevent the water from being contaminated again.

The fluidized electric field method changes the condition of a variety of things and gives a new function or "activity" to water molecules relying upon an electrochemical method.

The specification of the invention filed previously describes that the group of substances called "electrets" includes tourmaline. However, the inventor's latest study has resulted in the discovery that tourmaline should not be included in this group of substances called electrets, since an electret is quite different in electric polarization from tourmaline.

The substances called electrets were first obtained by melting a certain kind of dielectric material followed by solidification of it between electrodes to which a DC voltage is applied. Even after the electrodes are removed, the surfaces that have been in contact with the electrodes remain electrified in a positive and negative polarity and the electret maintains the electrification for a long time. This substance is called an "electret" after the magnet. Thereafter, several kinds of electrets composed of high molecular compounds such as polyfluorovinylidene (PVDF) were developed. Among the ferromagnetic materials, magnets embody those which have relatively strong residual magnetism and coercive force. Among magnets, those having a great residual magnetism and coercive force are called "permanent magnets".

The residual magnetism of a magnet is lost when the material is heated to a certain temperature. It can be, however, magnetized again by an external magnetic field. An electret cannot sustain the electric charges at room temperature, even without heating, that is, the charge holding capacity is small. It does not therefore correspond to a magnet called a "permanent magnet" but to a magnet having a weak coercive force. The word "electric pole" in contrast to "magnetic pole" is used. The inventor of the present application has studied and experimented on the electric properties exhibited by tourmaline, and has discovered the following facts.

(1) That tourmaline is not a ferroelectric substance but is a polar crystalline material.

(2) The crystal bonds of tourmaline are mostly of ionic bonds but partly of covalent bonds. The center of the ionic molecule at a lattice point of the crystal is fixed in a position apart from its true position and is in a strained condition. The reason why the positive and negative electric poles develop at both ends of the crystal and why this distortion is fixed is that crystals of a new substance are formed in a certain environment of heat, pressure, water and gases produced by the contact of a magma (lava) with a certain kind of igneous rock (granite), and the lattice structure of the crystals is fixed by rapid cooling in a strained condition compared with the normal structure. In order to remove the strain, the size and shape of the crystal lattice must be changed requiring large amounts of energy. Because of this, tourmaline has a property of so-called permanent electric poles which persist due to a large capacity to hold the electric polarization.

When heated to about 1000° C., the permanent electric poles vanish and do not develop any more even when an external electric field is applied thereto. There are many ferromagnetic materials that can be called permanent magnets, but it has long been said that no substance has been found among dielectric materials that can be called a permanent electret having permanent electric poles (for example see Knowing Ceramics, by Sumio Sakubana, Professor in Kyoto Univ., p. 22, published by Agnes Co.).

In view of the above literature and research, the present inventor is the first to discover that tourmaline has electric poles corresponding to the magnetic poles of a permanent magnet.

The reason why the positive and negative electric poles appearing at both ends of the tourmaline crystal are not neutralized and extinguished is probably because the crystals between the electric poles has high electric insulation, the amounts of electrons donated and accepted between the positive and negative electric poles are the same, and the electrons passing through the crystal lattices between the electric poles are mobilized by the ionic lattices and by the action of the dielectric material that includes fine crystals of tourmaline. However, the principle and mechanism thereof will be clarified by future study.

What is important for the present invention is that tourmaline exhibits electric polarization that corresponds to permanent electric poles as an electric characteristic, and this fact was discovered by the present inventor for the first time. The inventor has further discovered another important fact. That is, the fact that water can be obtained having an interface activity owing to the reaction between water and the permanent electrodes of the tourmaline crystals. This will be described below.

As for the electric properties possessed by the tourmaline, there have been known only the properties of piezoelectricity discovered by Jacques and Pierre Curie in about 1890 and pyroelectricity discovered thereafter. These properties of tourmaline pertain to an "electrification phenomena" which are quite irrelevant to the "existence of permanent electrodes". The present inventor has clarified through experiments the existence of the permanent electric poles in the tourmaline. The inventor has also clarified that the permanent electric poles can be lost at a certain temperature between 950° C. and 1000° C. These experiments are summarized below. Owing to the discovery of such facts, high molecular compounds that have heretofore been referred to as an electret should now be distinguished from tourmaline.

Insofar as the conventional term "electret" corresponds to a magnet, tourmaline should be called a permanent electret, considering that it has permanent electrodes. At present, furthermore, such characteristics have been found in tourmaline only. In this application, therefore, such material are referred to as "tourmaline" to avoid misunderstanding and confusion.

Described below is a monomolecular film formed by an interface activating substance.

A hydrophobic group of an interface activating substance and water repel each other and may exhibit two behaviors. One behavior is where the hydrophilic groups of the interface activity substances are attracted to water, while the hydrophobic groups protrude in the direction opposite to water, and the substances collect in an interface to form an oriented monomolecular film. The other behavior is where the hydrophobic groups collect together in spheres called "micelles" in the water so that the contact surfaces between the hydrophobic groups and the water may decrease. The spheres stably exist in water because the sphere's exterior surface is covered with hydrophilic groups. Hydroxyl ions ($H_3O_2^-$) act as an interface activating substance to form a monomolecular film too. The hydroxyl ions migrate via water molecules in a hopping system at a speed much faster than that of ordinary ions that migrate pushing the water molecules aside.

The monomolecular film formed in the interface of water covers the whole interface of water; namely, water is enveloped with this film. The monomolecular film has a thickness of 5 to 10 angstroms which is very thin compared with the total amount of water.

Hydroxyl ions are formed by the electrolytic dissociation of water in very small amounts and the monomolecular film is formed by the collection of this substance on the interface in very small amounts. Therefore, the concentration is sufficiently large. Hereinbelow, water is classified into "water of interface" and "whole water" for easy understanding.

Described below are the two actions of the hydroxyl ion and its effects.

Free hydroxyl ions, as a weak interface activating substance, produce water having such interface activities as emulsification, colloidization, dispersion, solubilization, wetting, permeation osmosis, etc. In addition to the above actions, there are the following actions due to the properties of the hydroxyl groups that are hydrophobic groups oriented in a direction opposite to the water.

(1) Reducing action on the interface.
(2) Neutralization (7.0 to 8.0) of ice on the interface.
(3) Chlorine is not volatilized as the hydrolysis of chlorine proceeds. No change takes place in the amount and condition of chlorine of internal water enveloped by the monomolecular film. The same also holds true for other volatile chlorine compounds.
(4) A compound, i.e., M(OH)n is formed on the surface of a metal (M) with which water is in contact and, then, the passive state of the metal is formed. Further, the neutral (or weakly alkaline) interface water of (2), together with the action (3), prevents the passive state of a metal from being destroyed and further works to maintain this state.
(5) The free hydroxyl ions react with a difficultly soluble metal compound to form a soluble salt thereof in a very small amount, and further form metal ions thereof.

SUMMARY OF THE INVENTION

In view of the aforementioned problems, the interfacial purifying apparatus using tourmaline, method thereof and tourmaline granular material according to the present invention, utilize electric energy created by the permanent electric poles of tourmaline crystals. Various matters adhered to the poles of the tourmaline crystals are dislodged by the fluidization, friction and washing conditions, so that the electrode surfaces are reexposed.

A fine powder of tourmaline crystals is enveloped with an electrically insulating material to form the free bodies, the crystals being electrically insulated so that electric charges of positive and negative poles may not be neutralized and cancelled.

According to the fourth to sixth inventions, furthermore, some known actions resulting from several dielectric phenomena exhibited by a dielectric material are multiply added to the tourmaline.

Concretely described below in detail are the interfacial purifying apparatus using tourmaline, method thereof and tourmaline granular material according to the present invention.

First, described below is the constitution of the interfacial purifying apparatus using tourmaline according to the first invention. There is first provided a plurality of free bodies composed chiefly of tourmaline. The free body is one in which the fine powder of tourmaline crystals is electrically insulated and solidified with an electrically insulating material. In this specification, this is referred to as the free body of tourmaline crystals.

The solidification is not limited to a method where the mixture is kneaded with water, dried and sintered like a ceramic material. It includes those methods of solidification using natural drying, and includes many kinds depending upon the kinds and properties of the electrically insulating materials (dielectric materials) that are used.

Next, there is a container having orifices for passing water but not passing the granular material. The container contains a plurality of free bodies composed chiefly of tourmaline. There is further a fluidizing means, i.e. water, which fluidizes the free bodies.

Described below is the constitution of the interfacial purifying apparatus using tourmaline according to the second invention. According to this invention, the fine powder of tourmaline crystals is electrically insulated with a ceramic material thereby to further increase the mechanical strength such as abrasion resistance.

First, there is a plurality of free bodies obtained by mixing tourmaline and a ceramic powder for raising the mechanical strength, followed by granulation and baking. Next, there is provided a container having orifices for passing water but not for passing the granular material. The container contains the plurality of the tourmaline free bodies. There further is a fluidizing means which fluidizes the free bodies.

Described below is the constitution of the interfacial purifying method using tourmaline according to the third invention. This invention relates to a method of using the interfacial purifying apparatus that uses the tourmaline of the aforementioned first invention.

First, the plurality of free bodies composed of tourmaline are fluidized in water. That is, the free bodies come into contact and collision with each other. The matters adhered to the surface of the free bodies are then dislodged by washing, and the above-mentioned steps are repeated.

Described below is the constitution of the interfacial purifying apparatus using tourmaline according to the fourth invention. In this invention, the free bodies of the first invention are mixed with free bodies containing electrically insulating ceramic particles having a dissimilar dielectric constant. Otherwise the apparatus is the same as that of the aforementioned first invention, and the whole description of its constitution is not repeated here.

Described below is the constitution of the interfacial purifying apparatus using tourmaline according to the fifth invention. In this invention, the free bodies of the second invention are mixed with free bodies containing electrically insulating ceramic particles having a dissimilar dielectric constant. Otherwise the apparatus is the same as that of the aforementioned first invention, and the whole description of its constitution is not repeated here.

Described below is the constitution of the interfacial purifying apparatus using tourmaline according to the sixth invention. In this invention, the free bodies of the third invention are mixed with free bodies containing the electrically insulating ceramic particles having a dissimilar dielectric constant. Otherwise the apparatus is the same as that of the aforementioned third invention, and the whole description of its constitution is not repeated here.

Finally, described below is the constitution of the tourmaline granular material according to the seventh invention. According to this invention, the tourmaline is sorted out from the tourmaline country rock that contains tourmaline in amounts greater than a certain value, ground and then pulverized to obtain a fine powder of tourmaline. Next, the fine particles or crystals of tourmaline are electrically insulated from one another using an electrically insulating material (dielectric material) and then solidified.

The solidification method is not limited to one in which the mixture is kneaded with water, dried and sintered like a ceramic material, and includes many kinds according to the kind and property of the electrically insulating materials that are used.

Concretely described below in detail is the operation of the interfacial purifying apparatus using tourmaline, method thereof and tourmaline granular material according to the present invention.

First, described below is the operation of the interfacial purifying apparatus using tourmaline according to the first invention. The free bodies composed of tourmaline are contained in the container which has orifices for passing water but not passing the plurality of the granular material; i.e., though the water is allowed to flow out, the granular material does not flow out from the container. The fluidizing means such as an ascending stream fluidizes the plurality of free bodies.

In the free bodies, the fine particles of tourmaline are electrically insulated from each other with an electrically insulating material, and the individual electric poles of the fine particles of tourmaline function effectively.

Described below is the operation of the interfacial purifying apparatus using tourmaline according to the second invention.

The electrically insulating (dielectric) ceramic material for reinforcing the abrasion resistance increases the mechanical strength of the tourmaline granular material and electrically insulates the fine tourmaline crystals. Otherwise the operation of the apparatus is the same as that of the first invention, and the description of operation thereof is not repeated here.

Described below is the operation of the interfacial purifying method using tourmaline according to the third invention. This invention deals with the purifying method by utilizing the free bodies of the aforementioned first invention. First, the free bodies are fluidized in water. Owing to this fluidization, the individual free bodies come into contact and collision with one another. Therefore, the adhered matters are dislodged from the surface of the free bodies. Then, the adhered matters dislodged from the electrode surfaces of the tourmaline are separated by precipitation from the water, and the electric poles on the surfaces of the free bodies appear. These steps are repeated.

Described below is the operation of the interfacial purifying apparatus using tourmaline according to the fourth invention. According to this invention, the free bodies of the first invention are mixed with free bodies of ceramic particles having a dissimilar dielectric constant. Operations stemming from the dielectric phenomena possessed by the dielectric materials multiply their effect. Otherwise the operation is the same as that of the aforementioned first invention, and the description of the operation thereof is not repeated here.

Further described below is the operation of the interfacial purifying apparatus using tourmaline according to the fifth invention. According to this invention, the free bodies of the second invention are mixed with free bodies of ceramic particles having a dissimilar dielectric constant. Therefore, the mechanical strength of the granular material composed of the tourmaline as a chief component is reinforced, and the dielectric phenomena thereof work to multiply the electric field effect produced by the tourmaline electric poles.

Other the operation is the same as that of the aforementioned second invention, and the whole description of the operation thereof is not repeated here.

The operation of the interfacial purifying method using tourmaline according to the sixth invention will now be described. In this invention, the free bodies of the third invention are mixed with free bodies of ceramic particles having a dissimilar dielectric constant. Therefore, the dielectric phenomena work is multiplied. Otherwise the operation is the same as that of the aforementioned third invention, and the whole description of operation thereof is omitted.

Finally, the operation of the tourmaline granular material according to the seventh invention will now be described.

A fine powder of tourmaline is selected from the tourmaline country rock that contains tourmaline followed by fine pulverization, the electric charges being cancelled by each other due to the attraction and contact of positive and negative electric poles thereof. Then, the fine powder is enveloped by an electrically insulating material, and is electrically insulated and is solidified. Accordingly, the electric poles appear on the individual particles of the tourmaline.

DESCRIPTION OF THE PREFERRED EMBODIMENTS

The interfacial purifying apparatus using tourmaline, method thereof and tourmaline granular material according to the present invention will now be described in detail in conjunction with the accompanying drawings.

Tourmaline has some different compositions. Basically, however, it is a silicate mineral containing boron. Belonging to a trigonal or hexagonal hemimorphic hemihedry group, tourmaline exhibits a hemimorphy which is asymmytrical with respect to the horizontal plane. A typical example is expressed by the following chemical formula, $$3[NaX_3Al_6(BO_3)_3Si_6O_{18}(OH,F)_4]$$

(X=Mg,Fe,Li,etc.)

The tourmaline exhibits a variety of colors according to the element X that is contained therein, ranging from no color, to red, yellow, green, blue, purple, brown, and black.

Figure 2:
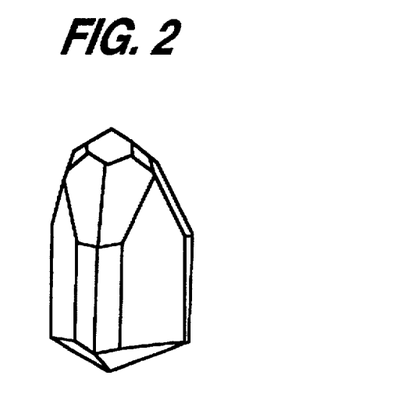
FIG. 2 is a front view of a tourmaline crystal.

Tourmaline has a specific gravity of from 3.1 to 3.2, and a hardness of 7.0 to 7.5 in Mohs' scale of hardness, which is slightly harder than quartz but is a little soft as a jewel. A green and beautiful tourmaline is compatible with emerald and is highly appreciated as a jewel in Western countries. FIG. 2 is a front view of a crystal thereof.

The most important feature among the electric properties of the tourmaline is neither the piezoelectricity nor the pyroelectricity properties, but rather the possession of permanent electric poles that correspond to permanent magnetic poles of a permanent magnet. Like permanent magnets, the permanent electric poles possessed by the tourmaline will be utilized and applied in various fields.

A dielectric material develops electric polarization in an electric field. However, there exists crystals that are electrically polarized originally even when no electric field is applied from the external side. In this crystal, the center of the positive charge and the center of the negative charge of a unit lattice are deviated from the positions where they should be. Since the "deviation" is very large, the crystal structure itself must be greatly changed in order to extinguish the polarity created by the "deviation". The crystal structure cannot be changed by the application of an external electric field of an ordinary intensity. Therefore, the electric polarity does not change.

In the tourmaline crystal, the electric poles are formed at both symmetrical ends. A sharp end of the crystal becomes a positive electric pole and a relatively flat end of the opposite side becomes a negative pole. The poles are not extinguished by an external electric field at room temperature and atmospheric pressure, and are thus called permanent electric poles. In view of the fact that the permanent magnetic poles of a magnet extinguishes at a Curie point, it is considered that the permanent electric poles would extinguish at a given temperature, however, it has never before been experimentally confirmed and announced.

The present inventor therefore has conducted the following experiments and confirmed the fact that the permanent electric poles of tourmaline are extinguished at 950° to 1000° C. The experiments will now be described below roughly.

Experiment 1

Igneous rock (produced in Kamaishi) containing about 8 to 10% of iron tourmaline was crushed into stones of about 5 to 10 cm, from which the crushed stones having a large content of tourmaline were selected visually and were used for the experiment.

Copper sulfate was dissolved in an amount of 2 g in 1000 cc of purified water (deionized water) to obtain a bluish solution due to copper ions. 500 grams of the crushed stones containing the tourmaline were immersed in this solution and were left for 24 hours. The blue color due to copper ions disappeared and the solution became colorless and transparent. After another three days, the black tourmaline portions on the surfaces of the crushed stones changed into a green color. This is the color due to a basic carbonate of copper [5H$_2$O.CuCo$_3$.Cu(OH)$_2$] which is so-called patina. This points to the fact that copper ions in the copper sulfate solution are electrically deposited on the portions corresponding to the negative poles of the tourmaline. However, no copper ion is electrically deposited on some exposed portions of the same tourmaline. These portions are ones corresponding to positive poles that have the same electric charges as the copper ions which are cations.

Experiment 2

The crushed stones were maintained at temperatures of 900° C., 950° C., 1000° C. and 1050° C. for one hour, and were then gradually cooled. The same results of the experiment using the four kinds of samples as those of the aforementioned Experiment 1 were exhibited. No change occurred in the color of the copper sulfate solution in which were immersed the samples maintained at 1000° C. and 1050° C. It is considered that the temperature corresponding to a Curie point lies between 950° C. and 1000° C. Presence of the temperature corresponding to the Curie point was found by conducting further experiments by other methods and by conducting the electrodeposition of several kinds of metals (copper, silver, nickel, etc.) and by chemically analyzing the amount of electrodeposition. The results all point to the possession of permanent electric poles by the tourmaline crystals and the presence of the temperature that corresponds to the Curie point somewhere between 950° C. and 1000° C.

The tourmaline resembles a ferroelectric substance in the sense that it exhibits pyroelectricity but is different from the ferroelectric substance in the sense that it does not exhibit a domain structure. It has further been described in the literature that those having permanent electric poles have not yet been found in ferroelectric substances. The tourmaline crystal bonds consist chiefly of ionic bonds but partly contain covalent bonds mixed therein.

Tourmaline is widely produced in ten or so countries including Brazil, Soviet Union, U.S.A., etc., and is used as a raw ore for jewels.

Most of the tourmaline was formed more than 10,000 years ago, in the age of neo-man (Cromagnon man) in terms of the history of man.

Despite the peculiar existence of tourmaline having permanent electric poles, tourmaline has been not so far much studied except for its use as a jewel.

The permanent electric poles possessed by tourmaline can be used in various applications. In order to study the actions of the permanent electric poles of tourmaline in water, the present inventor has prepared a granular material containing tourmaline as described below.

(1) The tourmaline country rock containing tourmaline in amounts greater than a certain value is sorted and is pulverized into a fine powder (several microns).

(2) A fine ceramic powder having high insulating property and good quality and the above powder of (1) were mixed together, and were granulated and sintered to prepare ceramic particles 3.0 to 3.2 millimeters in diameter.

(3) The granular material was subjected to the "mutual rubbing" method in which the particles were rubbed by each other in water, so that the surfaces of the granular material may became as smooth as possible and one surface of the tourmaline crystal may be exposed.

The thus obtained granular material was charged into a pipe made of stainless steel.

The height of the layer of the charged granular material was about 10 to 20 cm. On the upper and lower sides of the charged layer, stainless screens were disposed so that the granular material could not leak. The volume of the spaces defined by the stainless screens was about 1.2 times as great as the volume of the granular material. This is called the fluidization layer.

Figure 1:
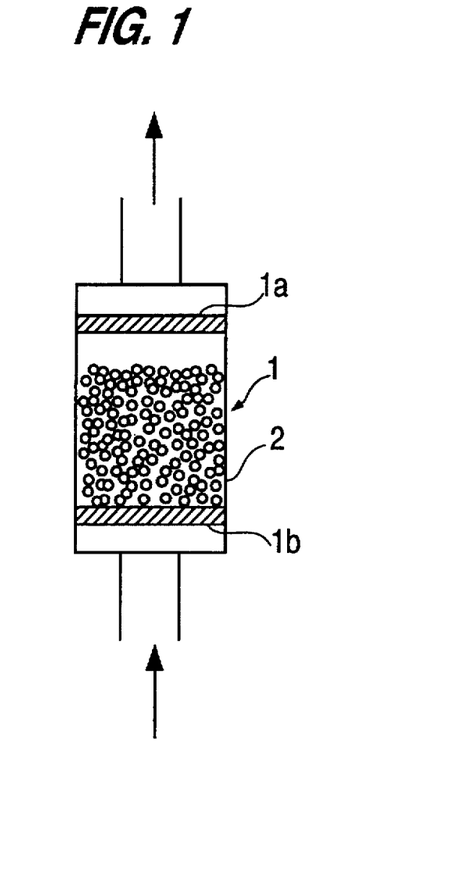
FIG. 1 is a side view of an embodiment of an interfacial purifying apparatus using tourmaline according to the present invention.
Figure 6:
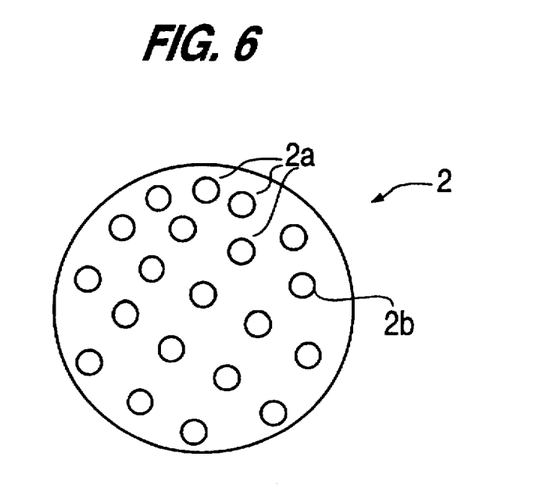
FIG. 6 is a side view of an embodiment of a free body containing tourmaline crystals.

An instrument 1 of a single structure was prepared as shown in FIG. 1, orifices 1a, 1b are provided on the upper and lower sides to permit the flow of water only, and an ascending stream through the fluidization layer is allowed. A phenomenon was expected that was created by the electric pole reaction with the water passing through the instrument 1 and the tourmaline electric poles on the surfaces of the tourmaline free bodies 2. Fine tourmaline crystals 2a are buried in a ceramic material 2b having a high electrically insulating property, so that the fine tourmaline crystals on the surfaces of the tourmaline free bodies 2 would not come close to each other to cancel the electrodes of opposite polarities. FIG. 6 shows this state. It is desired that there exist the tourmaline electrodes as many as possible on the surface. The content of the tourmaline that is considered to be suitable is from about 5 to 10% of the total amount of the granular material.

In the case of the iron tourmaline as described above, it was confirmed that the temperature (Curie point) at which the tourmaline loses the permanent electric poles, i.e., at which the electric polarization extinguishes, lies somewhere between 950° and 1000° C.

Next, described below is the reaction between the water passing through the fluidized layer and the tiny electric poles of the tourmaline. Though the water molecules are represented as H$_2$O, the condition of water in practice is very complex and is dynamic. Interatomic bonding of hydrogen and oxygen constituting the water molecules and the coupling and collection of water molecules are all dynamic and never stay under a static condition even for a moment. Under normal conditions, two hydrogen atoms and one oxygen atom of a water molecule are bonded together with the same bonding force. There, however, may exist a moment at which the oxygen atom is strongly bonded to one hydrogen atom but is loosely bonded to the other hydrogen atom. In such a case, H$_2$O is divided into an H$^+$ ion and an OH$^-$ ion.

Figure 3:
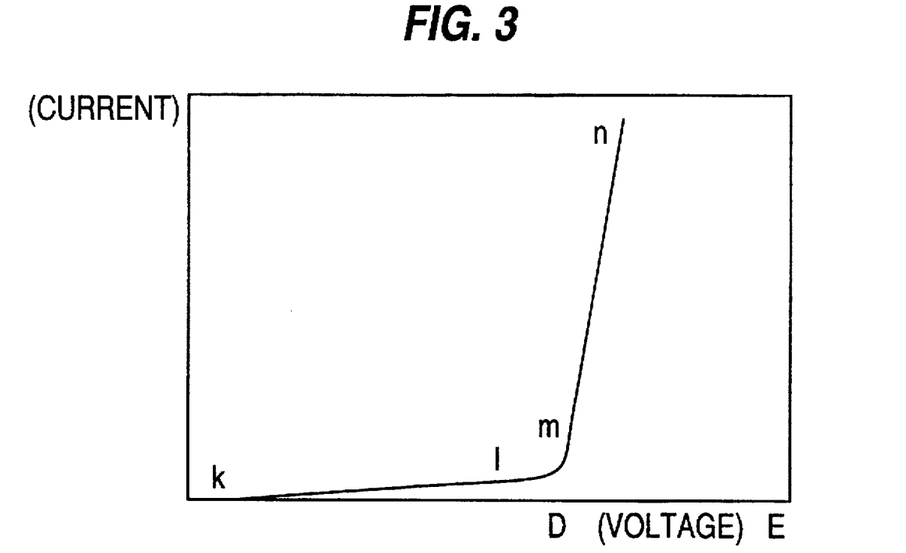
FIG. 3 is a diagram illustrating the electrolysis of water.

This state is shown in FIG. 3, wherein hydrogen and oxygen constituting a water molecule and sometimes OH ions are dynamically bonded together.

As a result, water behaves like a single huge molecule. This state cannot be expressed using a static model or formula but its overall condition at a moment can be considered. If the condition of water is statistically analyzed, it can be said that the water is under an equilibrium condition expressed by when no electric field is applied thereto. When the equilibrium formula is expressed using words, water is said to be "very weakly dissociated".

When there exist electric poles of tourmaline in water, H$^+$ ions and OH$^-$ ions migrate toward the surfaces of electric poles of polarity opposite to those of the ions, and an electric current flows between the electrodes. The current varies in proportion to the voltage across the electric poles. When this voltage is lower than a so-called electrolytic voltage of water as represented by a portion on the left side of point D in FIG. 3, a hydrogen gas may evolve on the cathode surface but no oxygen gas evolves on the anode surface.

A hydrogen ion H$^+$ is bonded to a water molecule to form H$_3$O$^+$ (hydronium ion) (FIG. 3). The three protons are bonded to oxygen atoms by the same bonding force at this moment, and their motions are very dynamic.

Figure 4:
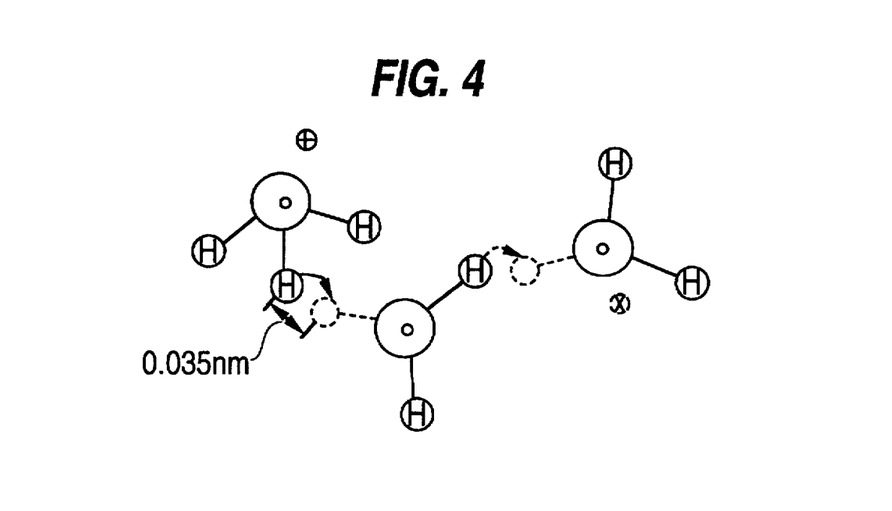
FIG. 4 is a diagram illustrating the migration mechanism of protons in an aqueous solution.

In this case, the hydrogen ion i.e., the hydronium ion migrates not as the migration of ionic substance; namely, due to the migration of electric charge, H$^+$ ions only transfer from a hydronium ion to the neighboring water molecule and, as a result, it seems the hydronium ion migrates. At this moment, the electric charge that participates in the electric conduction exhibits the so-called "protonic conduction by hopping model" (see FIG. 4).

As for the migration of $OH^-$ ions (hydroxyl ions), the $OH^-$ ion of $H_3O_2^-$ having electric charge migrates in a manner of passing a baton by the hopping model in the same manner as the case of $H^+$. The migration speed of $H^+$ ions is about 1.8 times faster than the migration speed of $OH^-$ ions. The electrolyte ions other than $H^+$ and $OH^-$ ions migrate at speeds of about 1/5 to 1/10 times as fast as the $H^+$ ions.

As described above, the migration speed of $OH^-$ ions is about one-half the migration speed of the $H^+$ ions. Furthermore, the $H^+$ ions are relatively easily discharged and precipitated on the electrode surface and turn into $H_2$ and are lost in the form of gas from the water. At a voltage lower than the electrolytic voltage of water, on the other hand, the $OH^-$ ions have a large discharge potential on the electrode surface and are absorbed in their own form or are diffused in water. For these two reasons, the $OH^-$ ions are liberated from the $H^+$ ions, and assume a free condition in water. The condition of the $OH^-$ ions is unstable even from the viewpoint of energy and is an active one. These ions are bonded to water molecules to form $H_3O_2^-$ (hydroxyl ions). The free hydroxyl ions exhibit properties as an interface activating substance.

The interface activity is a phenomenon in which the interface energy decreases when a substance dissolves in a liquid. In order that the interface activity is exhibited, the substance must be such that hydrophobic and hydrophilic groups coexist in a molecule thereof. These groups must keep their balance in a given range. The interface activity can be recognized by practical tests for concrete actions such as solubilization and emulsification.

It will be considered below that the interface activity exhibited by the liberated hydroxyl ions ($H_3O_2^-$) produced in water that has passed through the fluidized layer of the tourmaline granular material. The hydroxyl ion has a simple structure, that of a water molecule $H_2O$ is bonded to $OH^-$.

H—O—H corresponds to a hydrophilic group and the rest H—O, particularly H—, serves as a hydrophobic group.

Figure 5:
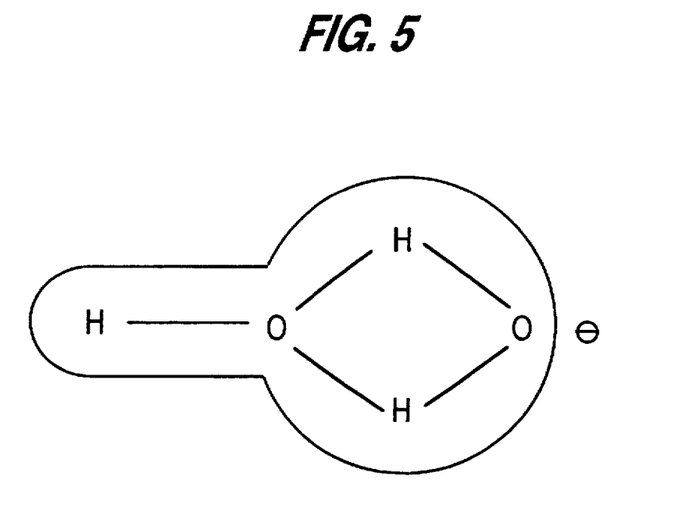
FIG. 5 is a model diagram of hydroxyl ions that work as an interface activating substance.

A model that a hydroxyl ion forms a small anionic interface activating substance shown in FIG. 5 can be considered. The negative charge of $OH^-$ transfers to O of H—O—H (to a place where a negative charge is marked in the drawing). As a result, the H—O and two H's of water are strongly bonded together.

Described below is the interface activity and, particularly, the emulsification action of water.

Heavy oil A of an amount of about 5% of the amount of water is mixed and stirred well. After some period of time, the heavy oil is mostly separated and floats on the surface of water but is partly emulsified and forms a stable dispersed phase. In water that has not passed through the fluidized layer, on the other hand, such a stable emulsion is not formed and the heavy oil easily separates from the water. When a droplet of water is added to this stable emulsion solution, the added water disperses in the whole emulsion solution to form a uniform layer. This fact indicates that the emulsification action is an oil-in-water emulsion (O/W type) and is not a water-in-oil emulsion (W/O type).

The H.L.B. value (hydrophile-lipophile balance) of an interface activating agent suitable for preparing the O/W-type emulsion (oil emulsion in water) is determined experimentally by comparison with various emulsifying agents, and is used for selecting an emulsifying agent suitable for the applications and for knowing the work of the emulsifying agent.

Figure 7:
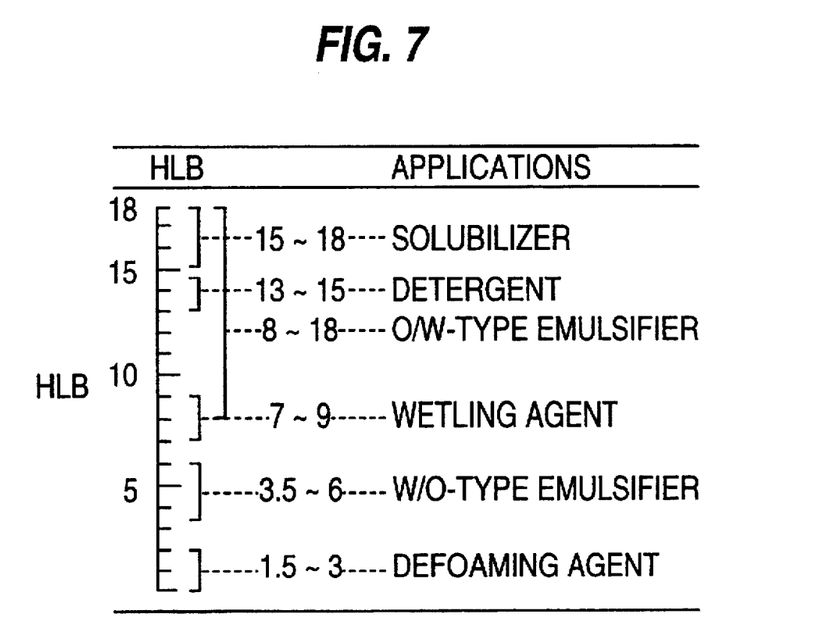
FIG. 7 is a diagram of comparison showing the relationship between the hydrophile—lipophile balance (H.L.B.) values and the applications.

Relationships between the H.L.B. values and the applications are shown in FIG. 7, and relationships between the H.L.B. values and the solubility are shown in a Table on the last page of the present disclosure. From this Table, the water that is emulsified assumes a stable milky condition and it is estimated that the H.L.B. value is from 8 to 10.

There have been proposed some methods for calculating the H.L.B. values. Among them, the Kawakami's method and Atlas' method are used to calculate the H.L.B. value of water containing hydroxyl ions.

(1) Kawakami's method.

H.L.B. value=$7+4.02 \log Mw/Mo$, where Mw and Mo are the molecular weights of a hydrophilic group and a hydrophobic group and Mw=18, and Mo=17, respectively. Therefore, the H.L.B. value=7.5.

(2) Atlas' method

The Kawakami's method and Atlas' method have conversion graphs, from which the H.L.B. value is found to be 10. According to these two kinds of calculations, it is estimated that the H.L.B. value lies from 7.5 to 10, which is in good agreement with 8 to 10 estimated from emulsification experiments.

Further, the substance that exhibits the emulsification action of the O/W type means that it has a property to emulsify oil components of the ordinary "foul components" made up of a mixture of oily foul matter and solid particles and to disperse the emulsified components in water, to invalidate the adherence of the remaining solid particles to the base members. This indicates the existence of a so-called cleansing action and proves the fact that water that has passed through the fluidized layer of tourmaline granular material and really removes oily foul matters and like matters. The interface activity of water quickly decreases and extinguishes in about three days. This can be easily observed by a experiment of emulsification. The time limit of three days becomes no hindrance in practice.

The fact that the water that has passed through the fluidized layer of tourmaline granular material exhibits interface activity without any chemical agent offers very great practical applicability.

The following actions are further exhibited in addition to the interface activity.

(1) The PH value is shifted toward the neutral point irrespective of whether it is acidic or alkaline.

(2) Hydrolysis of chlorine dissolved in water is promoted and $Cl_2$ is changed into HOCl, $OCL^-$, etc. to greatly lessen stimulation, taste and odor of chlorine.

(3) Weak reducing action is exhibited.

(4) A polymer such as active silica that exhibits coagulating effect is formed. This is attributed to the ionization of alumina, silica, iron oxide, etc. that constitute tourmaline granular material and to the polymer crosslinking action based on the electric poles reaction.

These actions multiply upon one another to exhibit a great effect.

Described below are the principal applications in which the interface purifying apparatus using tourmaline granular material and the method thereof are put into practice.

(1) Removal and prevention of red water, scale and slime of water-supplying and -distributing conduits in buildings.

(2) Utilization of various effects in kitchen, bath room, washing and other works using water by connecting the apparatus to the water supply pipe in dwellings.

(3) Installation for water source of public bathhouses or of any other baths.

(4) Arrangement in a circulation conduit such as of swimming pools.

(5) Utilization as water for cooking, processing and washing foods.

There are a variety and wide range of fields in which the invention can be applied, which reflects the importance of water in our lives.

According to further embodiments, the fine powder of tourmaline may be electrically insulated with a ceramic material to further reinforce the abrasion resistance. Moreover, the free bodies may be mixed with free bodies of electrically insulating ceramic particles having a dissimilar dielectric constant.

The interfacial purifying apparatus using tourmaline, method thereof and tourmaline granular material according to the present invention are constituted as described above, making it possible to obtain water having surface activity using neither a chemical agent nor electric energy supplied externally.

TABLE

| Solubility in water | Applications |
|---|---|
| Does not disperse. | 1 to 3 |
| Disperses a little. | 3 to 6 |
| Disperses into a milky form when strongly aggitated and mixed. | 6 to 8 |
| Stable milky dispersion. | 8 to 10 |
| Semitransparent or transparent dispersion. | 10 to 13 |
| Dissolves transparently. | 13+ |

What is claimed is:

1. An interfacial purifying apparatus using tourmaline consisting essentially of:

a housing containing a plurality of free bodies, said free bodies comprising a mixture of fine tourmaline crystals which possess polarity and an electrically insulating material which electrically insulates the fine tourmaline crystals from one another, wherein said fine tourmaline crystals are several microns in diameter, wherein said free bodies are spherical pellets about 3.0 to 3.2 millimeters in diameter, wherein said free bodies are comprised of about 5 to 10% of said fine tourmaline crystals, wherein said free bodies are prepared by mixing, granulating and baking said fine tourmaline crystals with the electrically insulating material, and wherein said housing includes a means for passing water through said housing while preventing the passage of said free bodies out of said housing; wherein said means for passing water through said housing while preventing the passage of said free bodies out of said housing comprises opposed inlet and outlet means having a plurality of apertures whose diameter is smaller than the diameter of said free bodies.

2. The interfacial purifying apparatus according to claim 1, wherein said electrically insulating material contains a ceramic material.

3. The interfacial purifying apparatus according to claim 1, wherein said free bodies contain electrically insulating materials having different dielectric constants.

4. The interfacial purifying apparatus according to claim 1, wherein the inner volume of said housing containing said free bodies is about 1.2 times as great as the volume of said free bodies.

* * * * *